United States Patent [19]
Parks

[11] 3,983,424
[45] Sept. 28, 1976

[54] RADIATION DETECTOR EMPLOYING ACOUSTIC SURFACE WAVES

[75] Inventor: Joel H. Parks, Los Angeles, Calif.

[73] Assignee: The University of Southern California, Los Angeles, Calif.

[22] Filed: Oct. 3, 1973

[21] Appl. No.: 403,096

[52] U.S. Cl............................ 310/8.1; 73/339 A; 333/30 R
[51] Int. Cl.² .................. G01K 11/22; H01L 41/10
[58] Field of Search............... 73/67.5, 67.6, 339 A, 73/552; 333/30 R, 72; 250/211 R; 310/8.1, 9.8

[56] References Cited
UNITED STATES PATENTS

| | | | |
|---|---|---|---|
| 2,667,063 | 1/1954 | Cunningham........................ | 73/67.6 |
| 3,186,226 | 6/1965 | Milnes et al. ..................... | 73/339 A |
| 3,453,595 | 7/1969 | Barrekette et al. .......... | 181/0.5 R X |
| 3,457,412 | 7/1969 | Cary ............................. | 73/339 A X |
| 3,534,609 | 10/1970 | Grenfell et al..................... | 73/339 A |
| 3,566,690 | 3/1971 | Ebrahimi............................ | 73/339 R |
| 3,582,838 | 6/1971 | DeVries......................... | 333/30 R X |
| 3,609,731 | 9/1971 | Evans............................... | 73/339 A X |
| 3,786,373 | 1/1974 | Schulz et al....................... | 333/30 R |
| 3,809,931 | 5/1974 | White et al. .................. | 333/30 R X |

OTHER PUBLICATIONS
(S 1525 0019) Auld, B. A. et al. *Control of Surface Wave with Photoconductive CdS Film*, in *Appl. Phys. Letters*. vol. 18, No. 8, Apr. 15, 1971. pp. 339–341.

(S 1521 0118) Tittmann, B. R. *A Technique for Precision Measurements of Elastic Surface Wave Properties on Arbitrary Materials*, in *Rev. Sci. Instr.* vol. 42, No. 8, Aug. 1971. pp. 1136–1142.

(S 0167 0101) Schulz M.B. et al., *Temperature Dependence of Surface Acoustic Wave Velocity on α Quartz*, in *Jour. Appl. Phys.* vol. 41, No. 7, June 1970. pp. 2755–2765.

*Primary Examiner*—Richard C. Queisser
*Assistant Examiner*—Frederick Shoon
*Attorney, Agent, or Firm*—Harris, Kern, Wallen & Tinsley

[57] ABSTRACT

A radiation detector utilizing temperature changes particularly suited for detecting small changes of short duration, such as produced by radiation pulses of microjoules of energy and 10 to 100 nanoseconds duration. An acoustic transmission line with transducers on a substrate providing an acoustic surface wave in the substrate, with the phase change in the wave being a measure of the temperature change at the surface of the substrate.

12 Claims, 4 Drawing Figures

RADIATION DETECTOR EMPLOYING ACOUSTIC SURFACE WAVES

This invention relates to temperature measurement and in particular, to new and improved devices for the measurement of very small temperature changes, which may be of very short duration.

Various devices are presently available for making direct thermal measurements, including the Golay cell, bolometers and thermocouples. These prior art thermal detectors are not generally capable of making accurate measurements of small, pulsed energy variations in the range of microjules and 10 to 100 nanoseconds duration. Also, these prior art devices are point response detection devices, and respond to temperatures in bulk as contrasted to surface thermal effects.

The temperature detection device of the present application provides for the measurement of temperature changes at the surface of a material with a sensitivity and time response substantially exceeding that of the conventional thermal detectors. The device of the present application provides for detecting or sensing temperature changes which may be of direct interest, or which may provide information on another phenomenon of primary interest. By way of example, the temperature detector can be used as a radiation detector by measuring temperature changes at the surface of the detector as a result of heating induced by radiative absorption. In another use, the device can be used in measuring or monitoring the kinetics of an exothermic or endothermic chemical reaction taking place on the surface of the detector.

It has been found that a change in temperature at the surface of an acoustic transmission line produces a change in phase of the acoustic signal between the transmitting transducer and the receiving transducer, the change in phase being directly proportional to the integrated change in temperature.

Accordingly, it is an object of the present invention to provide a new and improved acoustic temperature detector incorporating an acoustic transmission line including a substrate with transducers mounted thereon for transmitting an acoustic surface wave in the substrate from one transducer to another, together with means for coupling an electrical signal source to one transducer and means for detecting a change in phase of the wave received at another transducer, with the phase change at the surface of the substrate between the transducers being a function of the temperature change. Other objects, advantages, features and results will more fully appear in the course of the following description. The drawing merely shows and the description merely described preferred embodiments of the present invention which are given in the way of illustration or example.

Figure 1:
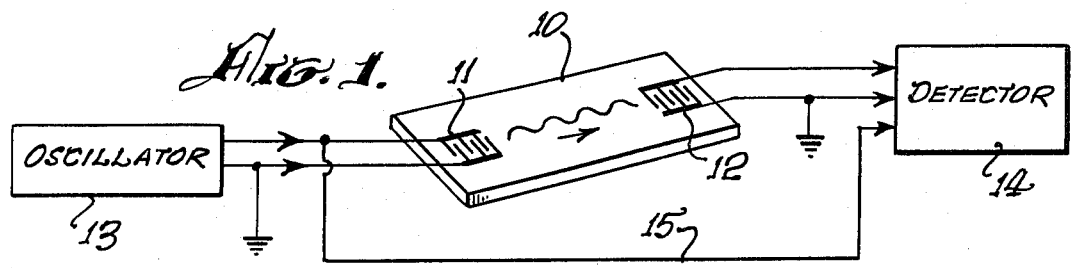
FIG. 1 is a diagrammatic view of an acoustic temperature detector incorporating one embodiment of the invention.

The detector of FIG. 1 includes a substrate 10 with acoustic transducers 11, 12 mounted thereon. An oscillator 13 provides an electrical signal to the transducer 11, and the transducer 12 is connected to a detector 14. A line 15 provides a reference signal from the oscillator to the detector.

The substrate 10 with the transducers 11, 12 functions as an acoustic transmission line for transmitting an acoustic surface wave in the substrate from the transducer 11 to the transducer 12. In one embodiment, the substrate 10 is a piece of piezoelectric material such as crystal quartz, typically one inch square and one eighth inch thick, and the transducers 11, 12 are interdigital transducers, each having two sets of interspaced metallic fingers applied directly onto the surface of the substrate. The electrical signal from the oscillator drives the transducer 11 generating an acoustic surface wave in the substrate which propagates toward the transducer 12. The acoustic surface wave arriving at the transducer 12 produces an electrical output which is coupled to the detector.

The phase of the acoustic wave arriving at the transducer 12 changes with change in the temperature at the surface of the substrate in the zone between the transducers, and the detector detects this phase change. The change in phase of the substrate is a function of the change in surface temperature.

The substrate 10 may be any material capable of sustaining surface wave propagation, with the elastic coefficient and the temperature variation being known or measureable. Piezoelectric materials are particularly suited for this purpose. Nonpiezoelectric materials may also be used, fused quartz, borosilicate glass, and sapphire being examples of nonpiezoelectric materials. Various known transducers may be utilized including the interdigital transducer, the wedge method transducer and the aluminum comb transducer. With the piezoelectric substrate, the interdigital transducer can be mounted directly on the substrate. With a nonpiezoelectric material, an interdigital transducer can still be used, as by mounting the transducer on a piece of piezoelectric material which in turn is bonded to the substrate, with the transducer on top or with the transducer between the piezoelectric and nonpiezoelectric materials.

Figure 2:
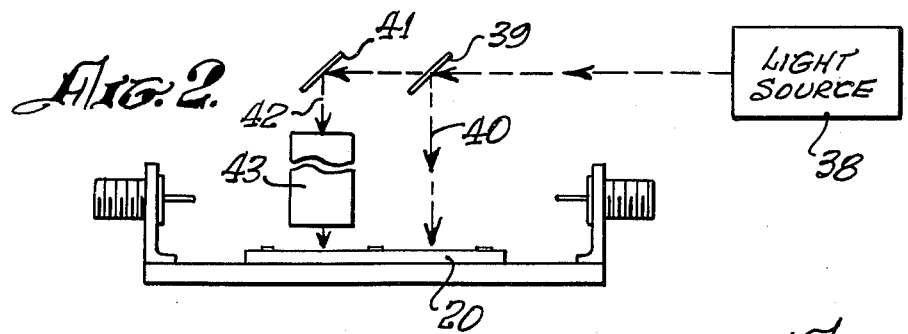
FIG. 2 is a side view of an acoustic temperature detector incorporating an alternative embodiment of the invention.
Figure 3:
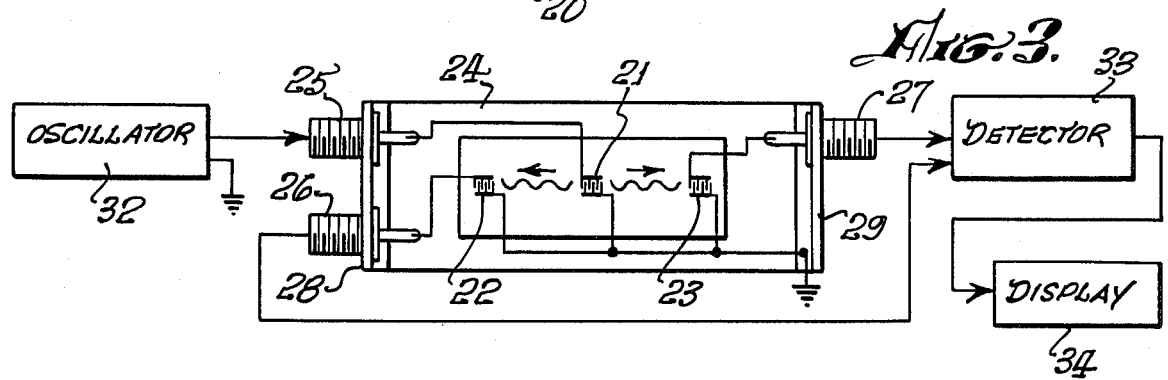
FIG. 3 is a top view of the detector of FIG. 2.

An alternative embodiment utilizing two paths for the acoustic surface wave is shown in FIGS. 2 and 3. A substrate 20 carries a transmitting transducer 21 and receiving transducers 22, 23 positioned on opposite sides of the transducer 21. The substrate 20 may be mounted on a base 24 having electrical connectors 25, 26, 27 carried in upstanding brackets 28, 29. An oscillator 32 provides an electrical signal to the transmitting transducer 21 through the connector 25. The receiving transducers 22, 23 are connected to a detector 33 through the connectors 26, 27. The detector output may be provided to a display unit 34 or to a recording unit as desired.

The detector of FIGS. 2 and 3 may be utilized in a dual beam system as shown in FIG. 2 with a source 38 directing a beam of radiation to a partial reflector 39 along a first path 40 to the zone between the transducers 21, 23, and through the reflector 39 to another reflector 41 along a second path 42 to the zone between the transducers 21, 22. A sample cell or tube or holder 43 may be inserted in one of the paths, here the path 42.

In operation of the detector of FIGS. 2 and 3, the difference in phase of the acoustic waves at the transducers 22 and 23 is noted at the detector 33 with the source 38 in operation providing radiation along both paths to the substrate. Then a sample is introduced into the cell 43 and the change in phase is noted. This change in phase provides a direct measure of the change in heating at the substrate surface in the zone between the transducers 21, 22, resulting from absorption of radiant energy by the sample in the cell 43. Characteristics of the sample can be related to the change in temperature by techniques not pertinent to the present invention.

The detector of FIG. 1 can be utilized for similar type measurements by first directing radiation to the substrate without a sample in the path, and then introducing the sample into the path and noting the change in phase.

The detector of the present invention has a very short time response and is particularly suited for detecting radiation pulses of very short duration. By way of example, the detector can respond to an energy pulse directed onto the substrate of a few microjules and of a duration in the order of 10 nanoseconds. A typical detector for operation in the infrared radiation range may utilize interdigital transducers of an overall size of 2 to 3 millimeters on a side with a finger width of about 5 microns, and operating at a frequency in the order of 300 megahertz. The fingers of the interdigital transducer serve as electrodes which generate a spatially periodic electric field having a period comparable to an acoustic wavelength. This electric field excites mechanical mass motion in the substrate via piezoelectric coupling. The acoustic wave is in the order of 1 millimeter wide and propagates along the surface of the substrate, extending a depth into the substrate less than an acoustic wavelength. The variation of the elastic coefficient of the substrate with temperature is sufficiently large to produce a detectable change in phase for temperature changes in the order of a few millidegrees. In a detector utilizing crystal quartz as the substrate, infrared radiation in the order of 10 microwatts will produce a phase change in the order of $10^{-3}$ radians.

Conventional equipment may be used for the oscillator and for the detector. Change in phase may be measured directly or change in frequency can be measured, since phase change can be related to frequency change.

Figure 4:
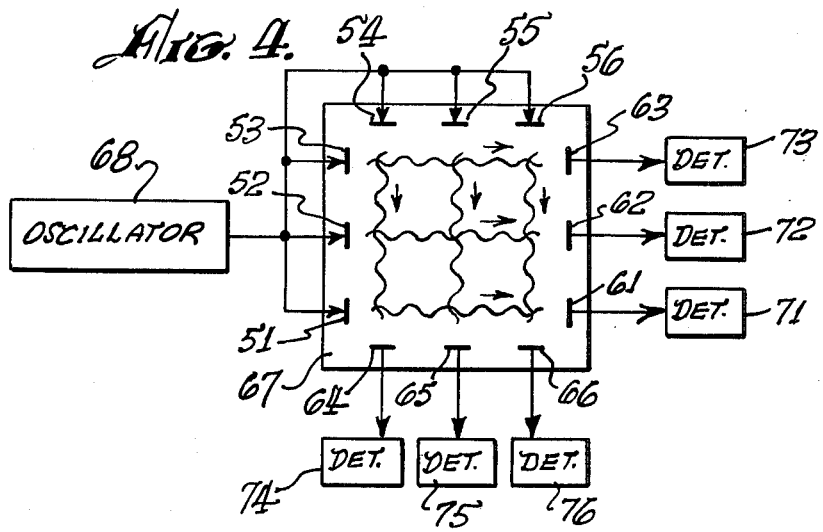
FIG. 4 is a top view of an acoustic temperature detector incorporating an array of transmission lines.

The phase of the acoustic wave is defined by an integration over the propagation path between the transmitting and receiving transducers. Hence the detector is not limited to a point response but rather integrates the temperature variation along the transmission path which tends to average out local temperature fluctuation. Variations in temperature along a path can be determined by scanning the transmission path over an area. In an alternative configuration, an array of transmission paths can be provided on a single substrate and one such configuration is illustrated in FIG. 4. Transmitting transducers 51-56 and receiving transducers 61-66 are mounted on a substrate 67, providing three horizontal transmission paths and three vertical transmission paths. The transducers 51-56 are driven from an oscillator 68, with a separate detector 71-76 for each path.

The array of FIG. 4 provides for locating a temperature change on the surface of the substrate 67. By way of example, if detector 73 and detector 75 each indicated increase in temperature while the remaining detectors indicated no change in temperature, this would show that the temperature increase is occuring in the zone of the intersection of the transmission paths between transducers 53, 63 and between transducers 55, 65.

The substrate may be a unitary material, such as those described above. Alternatively, the substrate may comprise a thin film of one material on a base of another material for obtaining benefits of properties of each of the materials. In one configuration, the substrate may be constructed so that the heating is generated at the surface of the base, with the phase variation coefficient being determined by the thin film on the base. By way of example, a cesium iodide film in the order of a thousand angstroms to one micron thick may be applied on a crystal quartz base. In this embodiment, the cesium iodide has a phase variation coefficient in the order of $1.6 \times 10^2$ greater than that of the quartz, while the quartz provides an infrared absorption coefficient in the order of $10^5$ times that of the film. The heating resulting from radiation absorption occurs at the surface of the quartz base. This temperature change in the quartz base produces a similar temperature change in the film with the resultant phase change in the acoustic wave propagated through the film.

In an alternative configuration, a thin film having a large absorption coefficient may be deposited on a base which is transparent to radiation in the wavelength region of interest, with the base material being chosen for a large phase change coefficient. By way of example, a silicon dioxide film may be deposited on a cesium iodide base, with the heating due to radiation occuring in the film and with the phase change occurring in the base.

Thin films may be deposited or grown on a substrate which supports the acoustic surface wave, and the composition of this film can determine the wavelength dependence of the detector. In this way, the detector responsivity is not limited to wavelengths absorbed by the substrate. By way of example, a strong infrared absorbing material is presently available (American Cyanimid Co., material H-99) which absorbs from 0.750 to 1.05 microns and is maximum at 0.980 microns. This film deposited on a crystal quartz substrate would make a sensitive detector for GaAs laser radiation at the wavelength 0.908 microns. Metallic films of gold, platinum and chromium (50–100A thick) absorb heavily from visible wavelengths to far infrared wavelengths. Such films will be useful for very broadband detection of radiation over a wavelength range of 0.2 to 50 microns.

It will be desirable for the detection of radiative pulses to eliminate the heat deposition from the detector surface as rapidly as possible after the pulse. This will allow the detection of higher pulse repetition rates. A thin film (1 micron thick) of high thermal conductivity material such as silicon can reduce the recovery time by as much as two orders of magnitude. Since Si is transparent at 10.6 microns, its deposition on a quartz substrate will form a $CO_2$ laser detector capable of resolving a repetition rate of 100 pulses/sec. The choice of substrate also can enhance the detector thermal recovery rate. Beryllium oxide is an insulator which can be grown single crystal, is piezoelectric, and has a thermal conductivity approaching that of copper. The material would serve as a desirable substrate to enhance decay.

The choice of substrate material can be used to enhance either sensitivity or pulse response. Materials which exhibit a ferroelectric phase transition are useful since near the phase transmition, the elastic coefficients, which determine the surface wave velocity, are orders of magnitude more sensitive to temperature variations at the substrate surface. This could lead to higher detector sensitivity. Materials of this type include triglyerinesulphate, strontium-barium-niobate, and antimony sulfoiodide. Substrate materials such as bismuth germanium oxide exhibit a very slow surface wave velocity which will increase the detector sensitivity to continuous radiation. This follows since the detected change in acoustic wave phase is inversely proportional to the wave velocity. The fast velocity materials such as lithium niobate are particularly useful for the detection of radiation pulses. In this case the rise time of the detected signal is limited by the transit time of the acoustic wave through the radiative spot size on the detector substrate. The time rise will be enhanced by using fast wave velocities.

I claim:

1. In a radiation detector, the combination of:
an acoustic surface wave transmission line including a substrate with a first surface and having first and second acoustic transducers directly mounted on said first surface for transmitting an acoustic surface wave at said first surface from the first transducer to the second transducer with the penetration of the acoustic wave into the substrate being in the order of the wavelength of the acoustic wave;
first means for coupling an electrical signal source operating in the megahertz range to said first transducer;
second means for detecting change in phase of the wave received at said second transducer; and
means for directing a beam of radiation onto said first surface between said transducers, with the phase change at the surface of said substrate between transducers being a function of the temperature change at said first surface resulting from incident radiation at said first surface.

2. A detector as defined in claim 1 wherein said second means includes means for connecting said electrical signal from said first means to said second means as a reference signal.

3. In a radiation detector, the combination of:
an acoustic surface wave transmission line including a substrate with a first surface and having first and second acoustic transducers directly mounted on said first surface for transmitting an acoustic surface wave at said first surface from the first transducer to the second transducer with the penetration of the acoustic wave into the substrate being in the order of the wavelength of the acoustic wave;
first means for coupling an electrical signal source operating in the megahertz range to said first transducer;
second means for detecting change in phase of the wave received at said second transducer;
means for directing a beam of radiation onto said first surface between said transducers, with the phase change at the surface of said substrate between transducers being a function of the temperature change at said first surface resulting from incident radiation at said first surface; and
a third acoustic transducer mounted on said substrate providing a second acoustic transmission line from said first transducer to said third transducer for use as a reference acoustic signal,
with said second means including means for connecting the outputs of said second and third transducers as inputs thereto for comparing the phase of said second and third transducer outputs.

4. A detector as defined in claim 1 wherein said substrate includes a base with a thin film thereon, with the base and film having different phase variation coefficients and thermal properties.

5. A detector as defined in claim 4 wherein said film has a relatively low phase variation coefficient and a relatively high radiation absorption coefficient with respect to said base.

6. A detector as defined in claim 1 wherein said substrate is crystal quartz and said first means provides a surface wave of wavelength in the order of 1 to 10 microns.

7. A detector as defined in claim 1 wherein said transducers are interdigital transducers.

8. An acoustic temperature detector comprising a plurality of acoustic surface wave transmission lines disposed in a predetermined array, each of said transmission lines including:
first and second transducers mounted on a common substrate for transmitting an acoustic surface wave at the surface of the substrate from the first transducer to the second transducer with the intersection of two transmission lines defining a location on said substrate and with the penetration of the acoustic wave into the substrate being in the order of the wavelength of the acoustic wave;
first means for coupling an electrical signal source to said first transducer; and
second means for detecting change in phase of the wave received at said second transducer with a change in phase indicating a change in temperature at the surface of the substrate along the path between the first and second means, and with changes in phase along two intersecting paths of the array identifying the location of the temperature change in the substrate.

9. In a radiation detector, the combination of:
an acoustic surface wave transmission line including a substrate with a first surface and having first and second acoustic transducers directly mounted on said first surface for transmitting an acoustic surface wave at said first surface from the first transducer to the second transducer with the penetration of the acoustic wave into the substrate being in the order of the wavelength of the acoustic wave;
first means for coupling an electrical signal source operating in the megahertz range to said first transducer;
second means for detecting change in phase of the wave received at said second transducer, with the phase change at the surface of said substrate between said transducers being a function of the temperature change at said first surface resulting from incident radiation at said first surface;
a third acoustic transducer mounted on said substrate providing a second acoustic transmission line from said first transducer to said third transducer for use as a reference acoustic signal,
with said second means including means for connecting the outputs of said second and third transducers as inputs thereto for comparing the phase of said second and third transducer outputs;
a source of a beam of radiation;

means for directing a portion of said beam along a first path to said first surface of said substrate between said first and second transducers;

means for directing a portion of said beam along a second path to said first surface of said substrate between said first and third transducer; and means for introducing a sample into one of said paths.

10. In a radiation detector, the combination of:

an acoustic surface wave transmission line including a substrate with a first surface and having first and second acoustic transducers directly mounted on said first surface for transmitting an acoustic surface wave at said first surface from the first transducer to the second transducer with the penetration of the acoustic wave into the substrate being in the order of the wavelength of the acoustic wave;

first means for coupling an electrical signal source operating in the megahertz range to said first transducer;

second means for detecting change in phase of the wave received at said second transducer, with the phase change at the surface of said substrate between said transducers being a function of the temperature change at said first surface resulting from incident radiation at said first surface;

said substrate including a base with a thin film thereon, with the base and film having different phase variation coefficients and thermal properties, and with said film having a relatively high phase variation coefficient and a relatively low radiation absorption coefficient with respect to said base.

11. In a radiation detector, the combination of:

an acoustic surface wave transmission line including a substrate with a first surface and having first and second acoustic transducers directly mounted on said first surface for transmitting an acoustic surface wave at said first surface from the first transducer to the second transducer with the penetration of the acoustic wave into the substrate being in the order of the wavelength of the acoustic wave;

first means for coupling an electrical signal source operating in the megahertz range to said first transducer;

second means for detecting change in phase of the wave received at said second transducer, with the phase change at the surface of said substrate between said transducers being a function of the temperature change at said first surface resulting from incident radiation at said first surface;

said substrate including a base with a thin film thereon, with the base and film having different phase variation coefficients and thermal properties, and said film being cesium iodide and said substrate being crystal quartz.

12. A method of measuring the rise time and amplitude of a radiation pulse, including the steps of:

transmitting an acoustic surface wave along a transmission line with the surface wave penetrating into the substrate of the line in the order of the wave length of the acoustic wave;

directing a radiation pulse onto the surface of the transmission line phase modulating the surface wave; and measuring the change in phase of the surface wave resulting from the radiation pulse.

* * * * *